July 4, 1961  J. B. GILL  2,990,612
PIPE CUTTING DEVICE
Filed Feb. 8, 1960
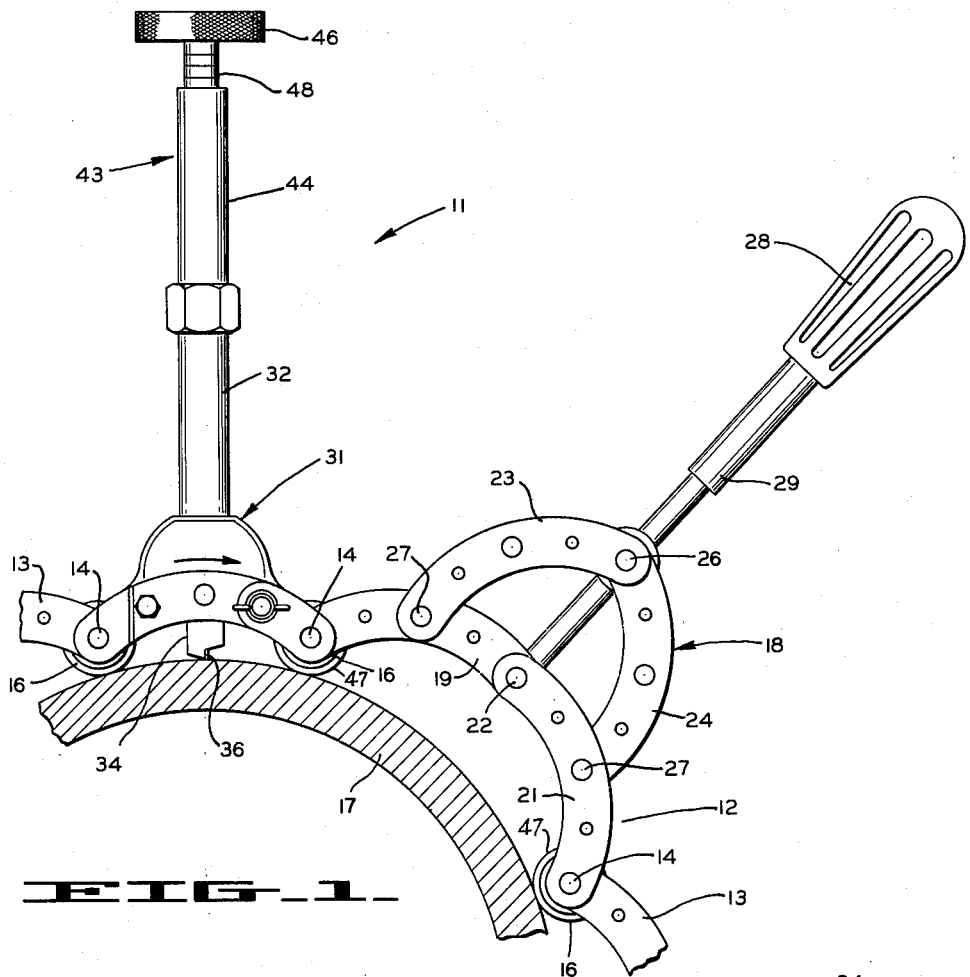
FIG_1_
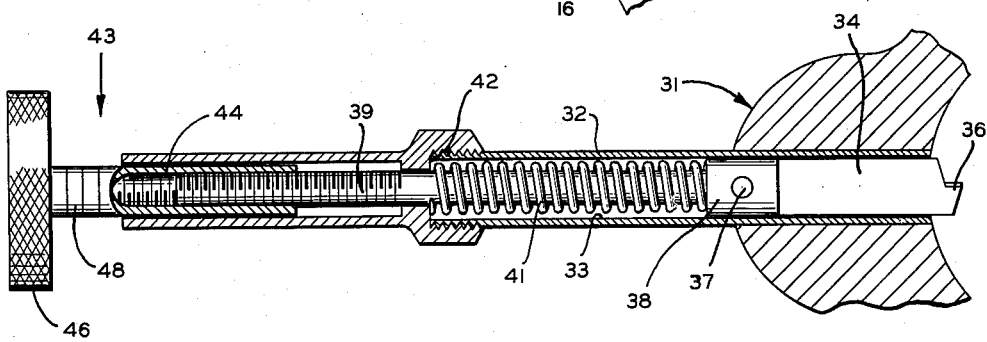
FIG_2_
INVENTOR.
JOHN B. GILL
BY
*Schapp & Hatch*
ATTORNEYS

United States Patent Office 2,990,612
Patented July 4, 1961

2,990,612
PIPE CUTTING DEVICE
John B. Gill, 20433 Earl St., Torrance, Calif.
Filed Feb. 8, 1960, Ser. No. 7,466
3 Claims. (Cl. 30—100)

The present invention relates to improvements in a pipe cutting device, and more particularly to chain-type pipe cutters such as those used in cutting and trimming asbestos cement pipe.

The pipe cutting device of the present invention is especially suited for use with pipe cutters of the character disclosed in my Patent No. 2,641,103, issued June 9, 1953, and entitled Detachable Link for Pipe Cutting Tools.

These cutters are composed of a plurality of arcuate links pivotally connected together at their ends to define a continuous chain adapted to encircle the pipe to be cut. Rollers at the juncture points of the links support the chain for movement around the pipe.

Major adjustments to different sizes of pipe are accomplished by removing and inserting complete links. Minor adjustments, such as tightening the chain around the pipe, are accomplished by varying the span of one or more of the links. For this purpose, link units having radially extending handles controlling the span of the unit are employed.

In the earlier cutter, the cutting blade was mounted for reciprocation in a housing which replaced one of the links. The position of the blade was adjusted by a handle having a threaded connection to the housing and a swivel connection to the blade so that twisting of the handle would move the blade in or out.

To operate these cutters, the chain was rotated around the pipe by grasping the handles on the link units. Each time the blade-adjusting handle came past the operator he would give it a twist to advance the blade another increment. This would continue until the wall of the pipe was cut through.

The main disadvantage of the described system lay in the periodic adjustment of the cutter blade. At the time of the adjustment, excessive strain was likely to be imposed on the parts due to twisting the handle too far. The sudden digging in of the blade created increased resistance to the rotation of the cutter. Moreover, near the end of the complete revolution, hardly any inward pressure was being exerted on the cutting blade.

The present invention contemplates a chain-type pipe cutter in which the cutter blade is urged inwardly at a constant pressure and at all positions of rotation of the cutter. With this structure, it is impossible for the operator to exert too much inward pressure on the cutting blade, and the blade is advanced evenly and at optimum pressure for a cut of maximum efficiency.

It is, therefore, a principal object of the present invention to provide a chain-type rotary pipe cutter in which the cutting element is advanced automatically into the cut at a constant, controlled rate preventing binding up or breakage of the parts because of excess pressure on the blade.

Another object of the invention is to provide a pipe cutter of the character described in which the blade is restricted from further inward movement once the cutting tip passes through the wall of the pipe.

Still another object of my invention is the provision of a pipe cutter as set forth in which the amount of inward travel of the blade may be pre-set to the wall thickness of the pipe being cut.

Further objects and advantages of my invention will be apparent as the specification proceeds, and the new and useful features of the same will be fully defined in the claims hereto attached.

The preferred form of my invention is illustrated in the accompanying drawing, forming part of this application, in which:

FIGURE 1 shows a side elevational view of a pipe cutting device constructed in accordance with the present invention together with fragmentary portions of the cutter chain and of a pipe to be cut; and FIGURE 2, a longitudinal cross-sectional view of the pipe cutting device showing details of interior construction.

While I have shown only the preferred form of my invention, I wish to have it understood that various changes or modifications may be made within the scope of the claims hereto attached, without departing from the spirit of the invention.

Referring to the drawing in detail, the cutting device 11 of the present invention is intended for use with a rotary chain-type pipe cutter 12. This chain may be of any well-known type such as the detachable link chain shown and described in the aforesaid Patent No. 2,641,103.

As here shown, the chain 12 includes a plurality of arcuate links 13 connected at their ends by pivot pins 14 upon which are journaled rollers 16 designed to support the chain for rotation about the pipe 17. Fine adjustment of the cutter is provided by one or more link units 18 replacing selected links 13.

The link units 18 consist of a pair of link members 19 and 21 carried at their outer ends on pins 14 and joined at their confronting ends by pivot pins 22. Secondary link members 23 and 24 are joined by pivot pin 26 and have their outer ends journaled on pins 27 located centrally of the length of link members 19 and 21.

A handle 28 is mounted on a rod 29 which extends radially of the pipe 17 and which has a threaded connection with pin 26 and a swivel connection with pin 22. Twisting of the handle 28 will cause the outer ends of link members 19 and 21 to move together or apart, thus shortening or lengthening the effective span of the link unit 18 to tighten or loosen the chain.

The cutting device 11 includes a housing 31 which may either replace one of the links 13, or be mounted on such a link in the manner shown in FIGURE 1 of the drawings. As here shown, the housing includes a tubular extension 32 providing a cylindrical chamber 33 extending radially with respect to the pipe being cut.

Slidably reciprocable in the chamber 33 is a cutting blade 34 having a cutting tip 36 extendable radially inwardly of the housing and into engagement with the pipe 17. The outer end of the blade 34 is secured, as by pin 37, to a cylindrical blade carrier 38 which is axially slidable in chamber 33.

Projecting axially outwardly from the blade carrier 38 is a rod 39 having external threads over a major portion of its length. A helical spring 41 is mounted in the chamber 33, in encircling relation to the rod 39, and is compressed between the outer end of blade carrier 38 and a shoulder 42 provided at the end of chamber 33. Shoulder 42 may conveniently be provided by forming housing extension 32 in two segments having a threaded connection, as shown in FIGURE 2.

The spring 41 is long enough to exert the desired inward pressure on the blade 34 over a distance equal to the wall thickness of the thickest pipe to be cut.

As an important feature of the invention, the blade is retained against proceeding inwardly once the pipe has been cut through whatever the wall thickness thereof. This prevents damage to the blade and its cutting tip 36.

The limitation of travel of the blade 34 is provided by stop means 43 at the outer end of housing extension 32. This stop means consists of an extension of the rod 39 having a portion engageable with the housing to limit inward movement.

While the stop means could be non-adjustable, better protection of the blade is afforded if it is halted from inward movement as soon as the wall of the pipe being cut is severed.

For this purpose, the length of the rod 39 is made adjustable. This is accomplished by engaging an internally threaded sleeve 44 with the outer end of rod 39 and by mounting an enlarged knob 46 on the end of the sleeve in position to engage the outer end of the housing and halt inward movement of the rod 39 and attached blade 34.

The threaded connection between rod 39 and sleeve 44 permits the knob to be moved inwardly or outwardly at will.

In operation:

The chain 12 is fastened around the pipe 17 to be cut with the blade tip 36 at the position of the cut. The knob 46 is rotated sufficiently to permit the blade tip to be pressed against the pipe by the spring 41.

One or more turns of the tool are then made to cut a slight groove in which central flanges 47, on the rollers 16, will ride, allowing the periphery of the rollers to engage the pipe. The handle 28 is twisted to tighten up the chain to the desired tension.

The knob 46 is then backed off until it is spaced from the outer end of housing extension 32 by a distance slightly greater than the wall thickness of the pipe 17. To facilitate estimating the distance, the sleeve 44 may be marked with indicia rings 48.

The tool is then rotated around the pipe by means of handles 28, the blade being fed constantly into the cut with optimum pressure by the spring 41. As the blade completes the cut, the knob 46 will come to rest against the housing, preventing the blade from springing inwardly and being damaged thereby.

While the cutting blade and its spring-loaded mounting has been described and shown as being adapted for use in connection with chain-type cutters, the structure is equally well adapted for use in other asbestos-cement pipe machining tools.

For example, a cutting blade is used in connection with tools for machining the ends of asbestos-cement pipe preparatory to installing fittings, the blade being used to cut off and trim the end of the pipe. A machining tool of this character is disclosed in my copending application, Serial Number 827,043, entitled Adjustable Pipe Machining Tool.

The present cutting blade mounting is particularly advantageous where the tool is power-driven, since the automatic advancement of the blade makes it unnecessary for the operator to grab for the adjusting handle every time the blade holder housing comes around the pipe. With the spring-loaded mounting, the operator need only back off the hand wheel 46 until the proper pipe wall thickness is indicated and then to press the switch to start the motor, the spring-loaded mounting thereafter advancing the blade automatically.

It should thus be apparent that the present invention may be employed to advantage in any asbestos-cement pipe machining tool employing a cutting blade.

From the foregoing, it should be clear that I have provided a novel mounting for a pipe cutting or trimming blade which incorpporates a unique system of feeding the blade into the cut by spring action and which will retain the blade against further inward movement as soon as the cut is completed.

I claim:

1. In a chain-type pipe cutter having a plurality of arcuate links and means for adjusting the span of the links to tighten the chain, a cutting device including a housing replacing one of the links and providing a chamber extending radially of the pipe upon which the cutter is mounted, a blade mounted for sliding reciprocation in said chamber and having an inwardly directed cutting tip, a spring mounted in said chamber and biased to urge said blade inwardly so as to cut through the pipe when the cutting device is rotated therearound, a rod secured to said blade and extending radially outwardly therefrom through said housing, and a knob threadably engaged with said rod for adjusting the distance of the knob from said blade cutting tip, said knob being formed to provide a shoulder adapted to engage said housing for limiting the inward movement of the blade.

2. A pipe cutter comprising, a plurality of arcuate links defining a chain adapted for mounting in encircling relation to a pipe to be cut, rollers on said chain for supporting the latter around the pipe, means for adjusting the span of at least one of the links for tightening said chain about the pipe, a housing replacing one of said links and providing a tubular chamber extending radially of the pipe, a blade mounted for sliding reciprocation in said chamber and having a cutting tip extending radially inwardly therefrom, a rod secured to said blade and extending radially outwardly therefrom through said housing, a helical spring mounted around said rod in said chamber and compressed between the outer end of said blade and the outer end of said chamber, and a knob threadably engaged with said rod for adjusting the distance of the knob from said blade cutting tip, said knob being formed to provide a shoulder adapted to engage said housing for limiting the inward movement of the blade.

3. In a pipe cutting tool, a housing mounted on said tool for rotation around a pipe to be cut, a blade mounted for sliding reciprocation in said housing and having an inwardly directed cutting tip, a spring mounted in said housing and biased to urge said blade inwardly when the cutting tool is rotated, a rod secured to said blade and extending radially outwardly therefrom through said housing, and a knob threadably engaged with said rod for adjusting the distance of the knob from said blade cutting tip, said knob being formed to provide a shoulder adapted to engage said housing for limiting the inward movement of the blade.

References Cited in the file of this patent

UNITED STATES PATENTS

| 2,639,501 | Harding | May 26, 1953 |
| 2,641,103 | Gill | June 9, 1953 |
| 2,747,275 | Jonasson | May 29, 1956 |

FOREIGN PATENTS

| 898,999 | France | July 24, 1944 |
| 1,076,630 | France | Apr. 21, 1951 |